F. T. MOYER.
SCARIFIER.
APPLICATION FILED JULY 9, 1918.
1,298,374.
Patented Mar. 25, 1919.
3 SHEETS—SHEET 1.
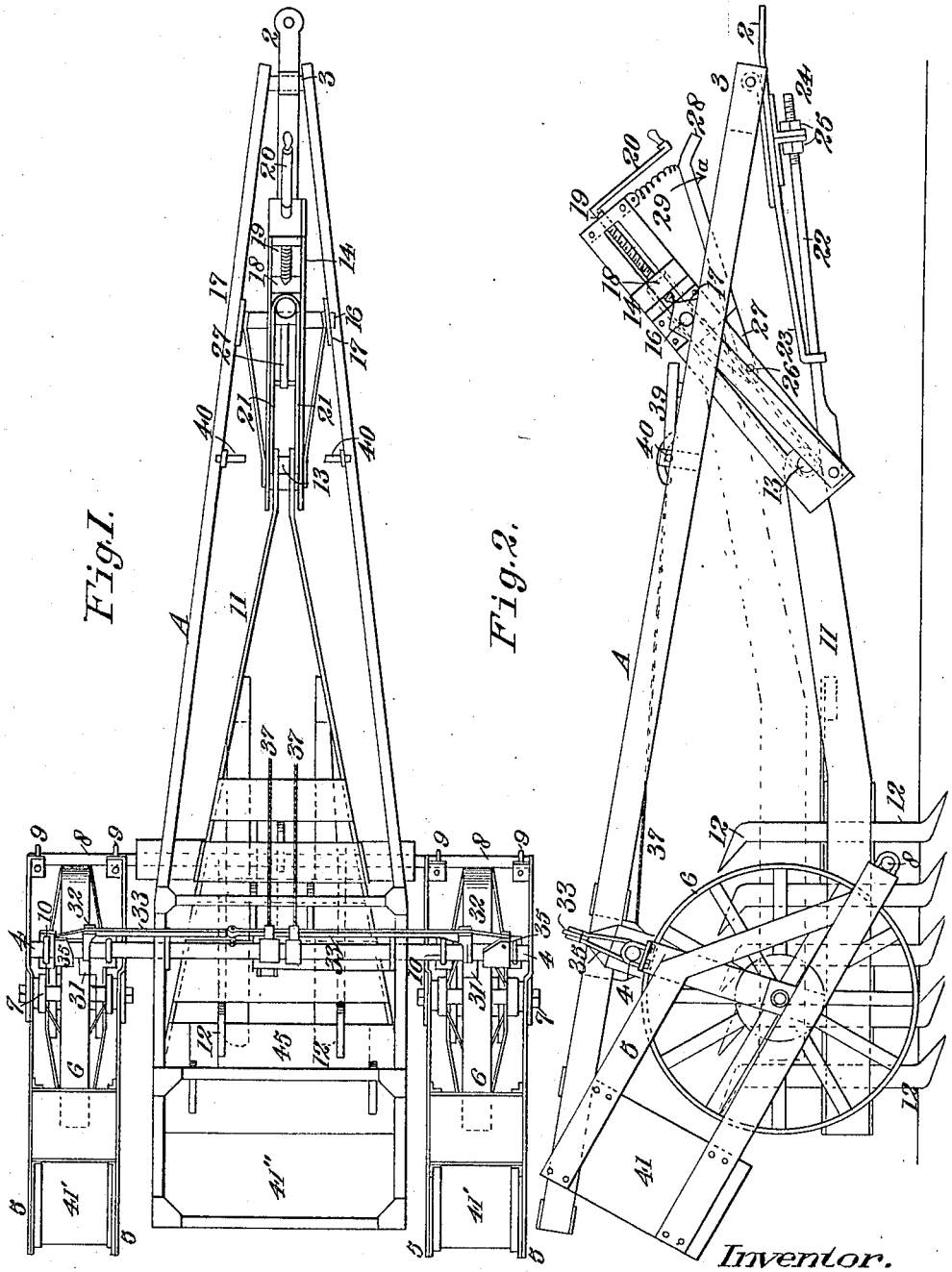
Inventor.
Franklin T. Moyer
By Strong & Townsend
ATTORNEYS

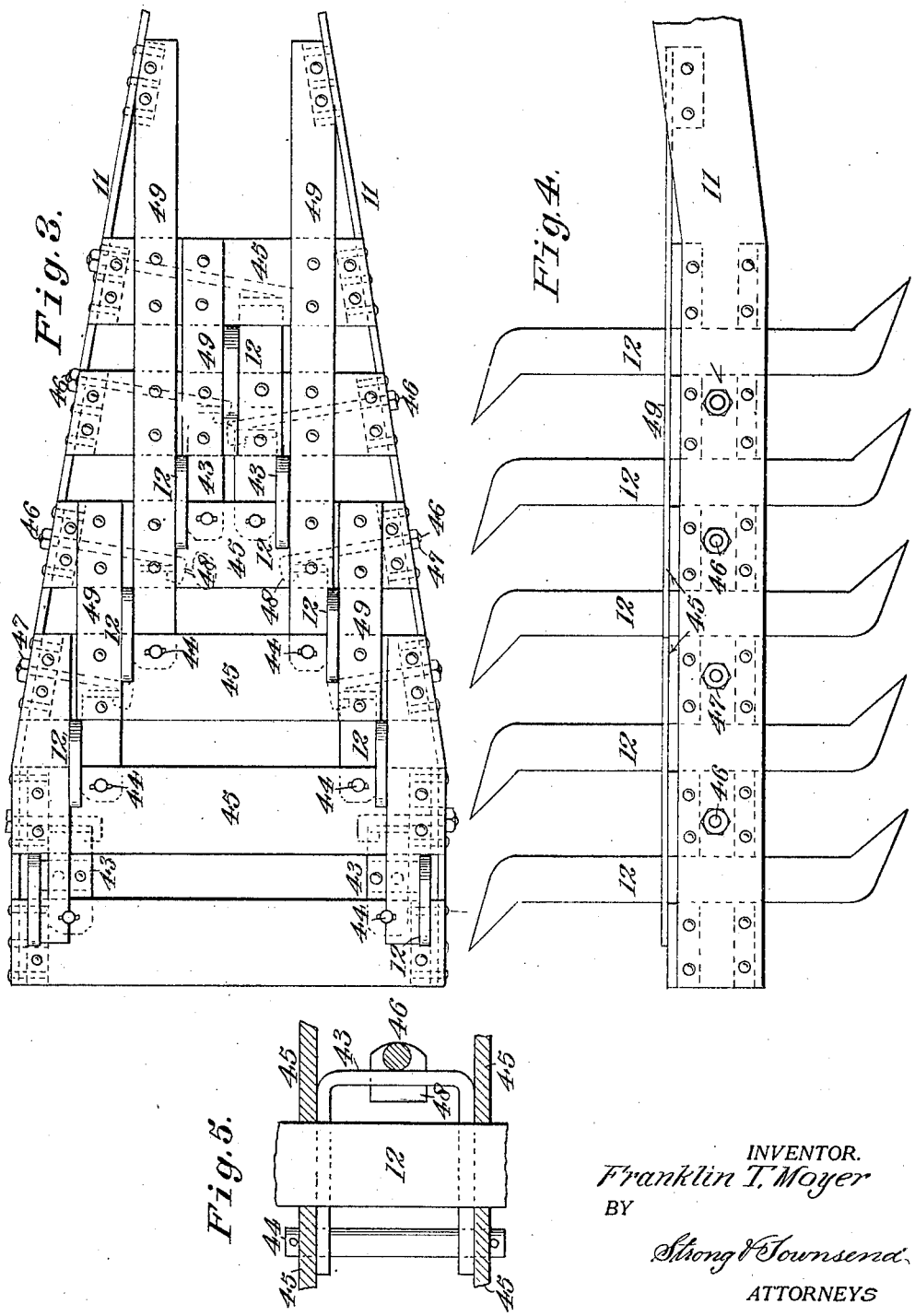

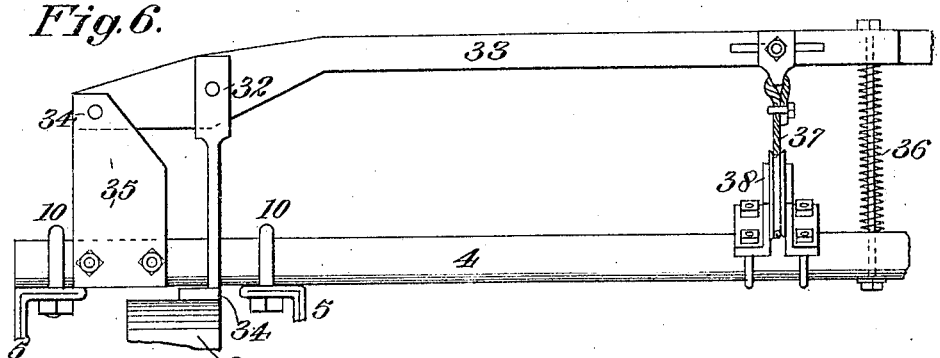
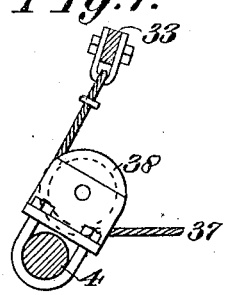
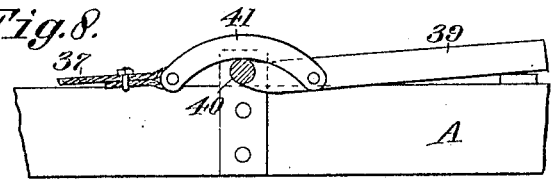
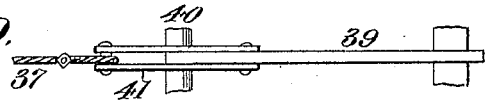
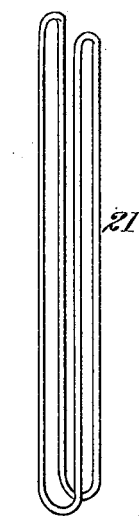
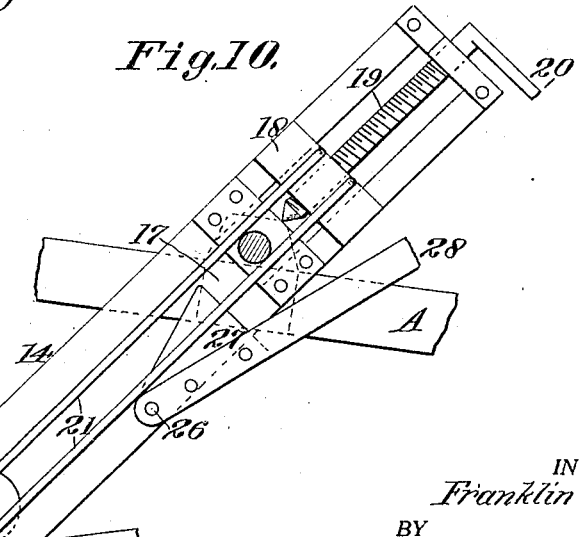

UNITED STATES PATENT OFFICE.

FRANKLIN T. MOYER, OF NAPA, CALIFORNIA.

SCARIFIER.

1,298,374.   Specification of Letters Patent.   Patented Mar. 25, 1919.

Application filed July 9, 1918. Serial No. 244,002.

*To all whom it may concern:*

Be it known that I, FRANKLIN T. MOYER, a citizen of the United States, residing at Napa, in the county of Napa and State of California, have invented new and useful Improvements in Scarifiers, of which the following is a specification.

This invention relates to a road scarifier for breaking up old road surfaces preparatory to relaying the same, and particularly to improvements on the structure shown in my former patent, entitled Scarifier, issued August 22nd, 1916, No. 1,195,387.

One of the objects of the present invention is to provide a scarifier comprising a main frame, a pair of intermediate frames, in each of which is journaled a wheel, a shaft carried by said intermediate frames whereby the rear end of the main frame is supported, a draw bar at the forward end of the main frame, a sub-frame, a plurality of tines secured in said frame and an adjustable connection between the draw bar and the tine of the frame to permit adjustment of the sub-frame and to vary the depth of the tines when operating on the road bed. Another object of the invention is to provide novel mechanism for securing said vertical adjustment of the sub-frame and the tines carried thereby, and in conjunction therewith to provide means for automatically raising the sub-frame and the tines carried thereby out of the ground and to lock the frame when in the raised position. Another object of the invention is to provide novel means for securing the tines in the sub-frame so that they may be quickly removed or independently adjusted when desired. Further objects will hereinafter appear.

The invention consists of the parts and the combination, construction and arrangement of parts as will be hereinafter more fully described and claimed, reference being had to the accompanying drawings, in which—

Figure 1 is a plan view of the scarifier.

Fig. 2 is a side elevation of same.

Fig. 3 is a detail plan view of the tine frame.

Fig. 4 is a side elevation of same.

Fig. 5 is a detail vertical section showing manner of locking the tines in place.

Fig. 6 is a detail view showing brake operating mechanism.

Fig. 7 is a detail view showing connection between brake-operating cable and lever.

Fig. 8 is a side elevation of the cable-operating lever.

Fig. 9 is a plan view of Fig. 8.

Fig. 10 is a detail view of the forward end of the sub-frame and operating connections.

Fig. 11 is a detail perspective of the hanger link.

Referring to the drawings in detail, A indicates the main frame of the scarifier, which, in this instance, is constructed of channel iron and V-shaped in plan view, as shown. Mounted in the forward end of said frame is a draw bar 2 which may be connected to a tractor or the like. This draw bar is pivotally mounted in the main frame, as at 3, and is therefore permitted a certain amount of swinging movement when traveling over uneven ground.

The forward end of the main frame is carried entirely by the draw bar and the tractor to which it is secured, while the rear end of the main frame is supported on an axle 4 which in turn is supported by a pair of intermediate frames 5 disposed one on each side of the main frame, these frames being in turn supported by wheels 6 of suitable construction, journaled one in each frame, as shown at 7.

Secured crosswise of the intermediate frames at the forward lower ends of the same is a second shaft 8. This shaft is secured by U bolts 9, or by any other suitable means, to the intermediate frames, and thereby serves as a means for connecting the same. This is also true of the shaft 4, as this is secured to the intermediate frames by means of U bolts 10. Both the shafts 4 and 8 therefore serve as connecting members between the intermediate frames, and the shaft 4 furthermore serves as a support for the rear end of the main frame A. The chief function of the lower shaft 8 is to support a sub-frame 11. This frame is also V-shaped and is provided for the purpose of supporting a plurality of scarifiers or tines, such as shown at 12. The manner of securing the individual tines in the frame will hereinafter be described.

The forward ends of the sub-frame are brought together and are pivotally attached to a pin 13, which is slidably mounted in a cross head frame 14. This cross head is pivotally mounted on a shaft 16 extending crosswise of the main frame and secured in brackets 17. These brackets are arranged near the forward end of the main frame and the cross head frame is pivotally mounted between the same and means is provided for adjusting the vertical height of the sub-frame and the angular position of the intermediate frames 5. Slidably mounted in the frame 14 is a cross head 18. The center portion of this cross head is threaded for the reception of a screw 19, on the upper end of which is mounted a handle 20. This handle when turned causes the cross head 18 to move vertically in the frame 14 and is provided for the purpose of limiting the vertical movement of the pin 13 in the cross head frame 14.

This is accomplished by securing a hanger 21 to the cross head. This hanger consists of a continuous rod bent in the manner shown in Fig. 11, that is, it is U-shaped at its lower ends and it is also U-shaped at the upper ends to permit it to straddle or hang on the cross head 18. Turning movement of the screw 19 by means of the handle 20 in one direction causes the cross head to travel upwardly in the frame 14, and as the hanger is supported by the cross head, it can readily be seen that this will also travel upwardly in unison with the same.

The pin 13, which passes through the lower looped ends of the hanger and the frame 14, also moves upwardly when this adjustment is made and thereby raises the sub-frame 11 forwardly and upwardly away from the ground, thus permitting vertical adjustment of the tines 12, this being due to the fact that the intermediate frames are pivotally mounted on the wheels 6 and also to the fact that the frame 14 is pivotally mounted on the main frame. A second adjustment for the same purpose is, however, provided by a link 22 which is pivotally attached at one end to the cross head frame 14 and slidably mounted in brackets 23 secured on the draw bar 2. The forward end of this link is threaded, as at 24, and provided with lock nuts 25. Forward movement of the link by the screw adjustment shown causes the frame 14 to swing about the pivotal mounting 16, thus swinging the lower end forwardly and simultaneously lowering the sub-frame 11. Two separate means of vertical adjustment, as far as the sub-frame is concerned, are thereby obtained.

Pivotally mounted, as at 26, on the cross head frame 14 is a latch 27, which is provided with a handle extension 28. This latch is normally held in the position shown in Fig. 2 by means of a spring 29 attached to the handle. This latch is provided for the purpose of engaging and supporting the pin 13 to which the forward ends of the sub-frame are pivotally attached, thereby holding the sub-frame in a raised position and the tines out of engagement with the road surface when not required or when hauling the scarifier from place to place. The sub-frame may be released at any time by pulling the lever in the direction of arrow a. This retracts the latch and disengages the pin 13, thus permitting it to move downwardly in the sub-frame and the hanger until the lower end of the latter is reached.

The scarifier is also provided with a brake comprising a pair of shoes 31, one engageable with each wheel 6. These brake shoes are provided, first, for the purpose of locking the wheels against turning when it is desired to raise the sub-frame, and, secondly, for exerting friction on the wheels when the tractor is hauled about and a down grade is encountered, and for other purposes as will hereinafter be described. Each brake shoe is secured, as at 32, to an arm 33 pivotally mounted, as at 34, on a bracket 35 secured on the shaft 4. There are two arms, two brake shoes and two brackets 35.

The free ends of the arms are normally held in raised position by springs 36 inserted between the shaft and the arms, but they may be depressed either in unison or independent of each other to apply the brake shoes by flexible cables 37, which are guided by pulleys 38 and secured at their opposite ends, each to a brake lever 39. These brake levers are pivotally mounted on a shaft 40 extending crosswise of the main frame, and each lever is provided with a link 41 to which the forward ends of the cables 37 are attached to permit the levers to be locked in their lowered positions shown in Fig. 2, that is, the pulling of the cables is exerted below the pivotal connection 40, thus locking the levers in their depressed positions.

In operation, with the draw bar 2 connected to a tractor or other source of power, it is possible to instantly lower the sub-frame having the tines 12 secured thereto into digging position, as shown in Fig. 2, by merely depressing the lever 28. This causes the latch to disengage the pin 13, thereby permitting the pin and the sub-frame attached thereto to drop to the lower end of the cross head frame 14 and the hanger 21. The sub-frame, when lowered to digging position, permits the tines to enter the road surface and the depth to which the teeth enter the road may be regulated either by the link 22 or by the screw 19. If, after a certain stretch of road bed has been thoroughly torn up and completed and it is desired to move to another location, it is possible to raise the sub-frame into the dotted line position shown by merely raising the pin 13 into engagement with the latch 27. This is accomplished by first applying the brakes 31 and then backing up the tractor. This backward pressure when exerted causes the main frame, together with the intermediate frames, to swing about the wheels to an approximate horizontal position, thus lifting the sub-frame forwardly and upwardly as it is supported almost entirely by the shaft 8. The forward end of the sub-frame, together with the pin 13, will, of course, simultaneously move upwardly in the cross head frame 14 and the hanger 21 and will finally engage the latch 27, which will automatically lock the members against movement and secure the sub-frame in its raised position. The brakes do not only serve the function of locking the wheels when it is desired to raise the sub-frame, but they also serve their normal function when traveling down grades, that is, with the sub-frame raised as when traveling from place to place, and they may also be applied at certain times to advantage when digging up a road bed, as pressure applied to the wheels in this manner tends to force the tines into the road surface, particularly when starting operations.

The scarifier shown in the present instance is simple when compared with the structure shown in my former patent. It is furthermore readily adjusted and operated under working conditions, as it can be instantly raised or lowered in relation to the road bed and may be adjusted whenever desired.

To counterbalance the frame structure as a whole and also to hold the teeth in digging position, a counterweight box, such as shown at 41' may be employed. This is secured between the rear ends of the main frame and may be filled with scrap iron, concrete or the like, to obtain any weight desired. The rear ends of the intermediate frames may also be provided with counterweight boxes, such as shown at 41'', if found necessary.

Another feature of the present invention is the provision of means for securely locking the individual tines 12 and also in providing a lock which may be quickly released or secured. This is accomplished by providing a series of locking bars 43. These are all pivotally connected, as at 44, to cross bars 45 secured to the sub-frame, and also by providing a hook-shaped bolt 46 in connection with each pivotally mounted locking bar. Each bolt is provided with a nut 47 which, when released, permits the hooked end 48 of each bolt to be turned out of engagement with its respective locking bar. A bar when thus released may be swung about its pivotal connection 44, thus permitting the tine to be removed or to be raised or lowered vertically as desired, the tines being secured between the cross bars 45, which are evenly spaced from end to end of the sub-frame, and also between the respective locking bars 43 and longitudinally extending bars 49 secured to the sub-frame and to the cross bars 45. Each tine is in this manner secured from four sides and should therefore be rigidly supported and held in position when digging, as each cross bar 45 consists of upper and lower bars which are interspaced a sufficient distance to provide a substantial support, particularly against endwise movement. The longitudinal bars 49 and the locking bars 45 may have any width desired, and they are not of as great importance as the bars 45 just mentioned, as they merely support the tines against lateral movement.

The materials and finish of the tines, together with the several parts forming the scarifier, may otherwise be such as the experience and judgment of the manufacturer may dictate.

I wish it understood that various changes in the form, proportions and minor details of construction may be resorted to within the scope of the appended claims, and that I do not wish to limit myself to the specific design and construction here shown.

Having thus described my invention, what I claim and desire to secure by Letters Patent is:

1. A scarifier comprising a main frame having its forward end adapted to be connected to a draw-bar, a pair of wheels, one on each side of said frame, an intermediate frame carried by the wheels supporting the rear end of the main frame, a sub-frame pivotally connected at its rear end to the intermediate frame, an adjustable connection between the forward end of the sub-frame and the main frame, and a plurality of tines carried by the sub-frame.

2. A scarifier comprising a main frame having its forward end adapted to be connected to a draw-bar, a pair of wheels, one on each side of said frame, an intermediate frame carried by the wheels, a pivotal connection between said frame and the main frame, a sub-frame pivotally attached to the intermediate frame, a cross-head guide secured to the forward end of the main frame, a cross-head vertically adjustable in said guide, a connection between the forward end of the sub-frame and the cross-head, and a plurality of tines carried by the sub-frame.

3. A scarifier comprising a main frame having its forward end adapted to be connected to a draw-bar, a pair of wheels, one on each side of said frame, a pair of intermediate frames carried by the wheels, a pivotal connection between said frames and the main frame, a sub-frame pivotally attached to the intermediate frame, a cross-head guide secured to the forward end of the main frame, a cross-head vertically adjustable in said guide, a connection between the forward end of the sub-frame and the cross-head, a plurality of tines carried by the sub-frame, a draw-bar pivotally attached to the forward end of the main frame, and means for locking said bar against pivotal movement.

4. A scarifier comprising a main frame having its forward end adapted to be connected to a draw-bar, a pair of wheels, one on each side of said frame, an intermediate frame carried by each wheel, a pivotal connection between said frames and the main frame, a sub-frame pivotally attached to the intermediate frames, a cross-head guide secured to the forward end of the main frame, a cross-head vertically adjustable in said guide, a connection between the forward end of the sub-frame and the cross-head, a plurality of tines carried by the sub-frame, and means independent of the cross-head for raising and lowering the sub-frame with relation to the main frame.

5. A scarifier comprising a main frame having its forward end adapted to be connected to a draw bar, a pair of wheels, one on each side of said frame, an intermediate frame carried by each wheel, a pivotal connection between said frames and the main frame, a sub-frame pivotally attached to the intermediate frame, a cross-head guide secured to the forward end of the main frame, a cross-head vertically adjustable in said guide, a connection between the forward end of the sub-frame and the cross-head, means independent of the cross-head for raising and lowering the sub-frame with relation to the main frame, and means for automatically locking the sub-frame in the raised position.

6. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of same, said shaft forming a support for the rear end of the main frame, a second shaft secured to and extending crosswise of the intermediate frames, a sub-frame supported by said shaft, and means for tilting the intermediate frames to raise and lower the sub-frame.

7. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of the same, said shaft forming a support for the rear end of the main frame, a second shaft secured to and extending crosswise of the intermediate frames, a sub-frame supported by said shaft, a plurality of tines secured in the sub-frame and a draw bar connection between the draw bar and the sub-frame.

8. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of the same, said shaft forming a support for the rear end of the main frame, a second shaft secured to and extending crosswise of the intermediate frames, a sub-frame supported by said shaft, a cross-head frame pivotally mounted near the forward end of the main frame, a connection between said cross-head frame and the sub-frame and means for tilting the cross-head frame about its pivotal mounting and for securing it when so tilted to adjust the vertical height or spacing of the sub-frame with relation to a road surface.

9. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of the same, said shaft forming a support for the rear end of the main frame, a second shaft secured to and extending crosswise of the intermediate frames, a sub-frame supported by said shaft, a cross-head frame pivotally mounted near the forward end of the main frame, a connection between said cross-head frame and the sub-frame, and an adjustable connection between the draw bar and the cross-head frame to permit tilting of the cross-head frame and to secure it when so tilted.

10. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of the same, said shaft forming a support for the rear end of the main frame, a second shaft secured to and extending crosswise of the intermediate frames, a sub-frame supported by said shaft, a cross-head frame pivotally mounted near the forward end of the main frame, a connection between said cross-head frame and the sub-frame, an adjustable connection between the draw bar and the cross-head frame to permit tilting of the cross-head frame and to secure it when so tilted, a cross-head slidably mounted in the cross-head frame, means for raising and lowering said cross-head and a connection between the cross-head and the sub-frame.

11. A scarifier comprising a main frame, a draw bar attached to the forward end of the frame, a pair of intermediate frames, one on each side of the main frame, a wheel journaled in each intermediate frame, a shaft secured to the intermediate frames and extending crosswise of the same, said shaft forming a support for the rear end of the main frame, a second shaft secured to and extending crosswise of the intermediate frames, a sub-frame supported by said shaft, a cross-head frame pivotally mounted near the forward end of the main frame, a connection between said cross-head frame and the sub-frame, an adjustable connection between the draw bar and the cross-head frame to permit tilting of the cross-head frame and to secure it when so tilted, a cross-head slidably mounted in the cross-head frame, means for raising and lowering said cross-head, a connection between the cross-head and the sub-frame and a latch in the cross-head frame to secure the sub-frame when in a raised position.

12. The combination with the sub-frame in a scarifier of the character described of a plurality of tines secured in the sub-frame, means for independently securing each tine, said means comprising a pivotally mounted locking lever for each tine and a hook-shaped bolt engageable with the free end of each locking lever.

13. The combination with the main frame and the sub-frame in a scarifier of the character described of a cross-head frame pivotally mounted on the main frame, a cross-head slidably mounted in said frame, means for raising and lowering said cross-head, a hanger attached to the cross-head, a pin mounted on the lower end of the hanger and slidably mounted therein and a pivotal connection between said pin and the sub-frame.

14. The combination with the main frame and the sub-frame in a scarifier of the character described of a cross-head frame pivotally mounted on the main frame, a cross-head slidably mounted in said frame, means for raising and lowering said cross-head, a hanger attached to the cross-head, a pin mounted on the lower end of the hanger and slidably mounted therein, a pivotal connection between said pin and the sub-frame, and a latch pivotally mounted in the cross-head frame adapted to engage the pin and secure it when in a raised position within the cross-head frame.

15. The combination with the main frame and the sub-frame in a scarifier of the character described of a cross-head frame pivotally mounted on the main frame, a cross-head slidably mounted in said frame, means for raising and lowering said cross-head, a hanger attached to the cross-head, a pin mounted on the lower end of the hanger and slidably mounted therein, a pivotal connection between said pin and the sub-frame, a latch pivotally mounted in the cross-head frame adapted to engage the pin and secure it when in a raised position within the cross-head frame, a draw bar pivotally mounted in the main frame, a link slidably mounted in said draw bar, said link being pivotally attached to the lower end of the cross-head frame, and means for locking said link to the draw bar when adjusted.

In testimony whereof I have hereunto set my hand in the presence of two subscribing witnesses.

FRANKLIN T. MOYER.

Witnesses:
N. P. NEILSEN,
HENRY BROWN.

Copies of this patent may be obtained for five cents each, by addressing the "Commissioner of Patents, Washington, D. C."